US009209973B2

(12) United States Patent
Aikas et al.

(10) Patent No.: US 9,209,973 B2
(45) Date of Patent: Dec. 8, 2015

(54) DELEGATE AUTHORIZATION IN CLOUD-BASED STORAGE SYSTEM

(71) Applicant: Google Inc., Mountain View, CA (US)

(72) Inventors: Erkki Ville Aikas, Seattle, WA (US); David Erb, Seattle, WA (US)

(73) Assignee: Google Inc., Mountain View, CA (US)

( * ) Notice: Subject to any disclaimer, the term of this patent is extended or adjusted under 35 U.S.C. 154(b) by 399 days.

(21) Appl. No.: 13/681,516

(22) Filed: Nov. 20, 2012

(65) Prior Publication Data
US 2014/0143543 A1    May 22, 2014

(51) Int. Cl.
| H04L 29/06 | (2006.01) |
| H04L 9/28 | (2006.01) |
| H04L 29/08 | (2006.01) |
| G06F 21/62 | (2013.01) |
| G06F 17/30 | (2006.01) |

(52) U.S. Cl.
CPC .............. H04L 9/28 (2013.01); G06F 17/3056 (2013.01); G06F 21/6209 (2013.01); H04L 63/101 (2013.01); H04L 67/1097 (2013.01); G06F 2221/2141 (2013.01)

(58) Field of Classification Search
CPC ..... H04L 63/101; H04L 9/28; H04L 67/1097; H06F 21/6209; G06F 21/6209; G06F 17/3056; G06F 2221/2141
USPC ........ 726/1, 26, 27, 28, 29, 30; 713/166, 167, 713/168
See application file for complete search history.

(56) References Cited

U.S. PATENT DOCUMENTS

| 7,926,087 | B1 | 4/2011 | Holl, II et al. |
| 8,176,283 | B1 | 5/2012 | Hanson et al. |
| 2007/0156842 | A1 | 7/2007 | Vermeulen et al. |
| 2010/0333116 | A1* | 12/2010 | Prahlad et al. ................. 719/328 |
| 2012/0090018 | A1* | 4/2012 | Padhye et al. ...................... 726/4 |
| 2013/0132232 | A1* | 5/2013 | Pestoni et al. ............. 705/26.25 |
| 2013/0347056 | A1* | 12/2013 | Kuhlman et al. ................. 726/1 |

OTHER PUBLICATIONS

Fotiou et al., "Access control enforcement delegation for information-centric networking architectures," Information-Centric Networking, ACM, Aug. 17, 2012, 85-90.
Invitation to Pay Additional Fees and Partial International Search in International Application No. PCT/US2013/070733, dated Mar. 4, 2014, 8 pages.
Wang et al., "Secure and efficient access to outsourced data," Proceedings of the 2009 ACM Workshop on Cloud Computing Security, CCSW '09, Nov. 13, 2009, 55-65.
International Search Report and Written Opinion in International Application No. PCT/US2013/070733, mailed Jul. 3, 2014, 21 pages.
International Preliminary Report on Patentability in International Application No. PCT/US2013/070733, mailed Jun. 4, 2015, 15 pages.

* cited by examiner

*Primary Examiner* — Brandon Hoffman
*Assistant Examiner* — Nega Woldemariam
(74) *Attorney, Agent, or Firm* — Fish & Richardson P.C.

(57) ABSTRACT

At a hosted storage service, a resource and a request to store the resource are received. The request includes a location of an access control service. The access control service is separate from the hosted storage service and controls access permissions for the resource. A request to access the stored resource is received. The hosted storage service accesses metadata stored in association with the resource and determines that access permissions for the resource are controlled by the access control service. An access request is from the hosted storage service to the access control service, the access request identifying the resource and a user of the client system.

22 Claims, 7 Drawing Sheets

DELEGATE AUTHORIZATION IN CLOUD-BASED STORAGE SYSTEM

TECHNICAL FIELD

This document relates to hosted storage.

BACKGROUND

Hosted, or cloud-based storage, refers to off-site or remote data storage that is typically provided by a third party. The third party may implement the hosted storage in a data center, and provide access to the hosted storage over a network, such as the Internet.

SUMMARY

In one aspect, a method is performed by one or more processors. The method includes receiving, at a hosted storage service, a resource and a request to store the resource, the request includes a location of an access control service. The access control service is separate from the hosted storage service and controls access permissions for the resource. The method further includes storing, at the hosted storage service, the resource in association with metadata that indicates the location of the access control service. The method further includes receiving, at the hosted storage service and from a client system, a request to access the stored resource. The method further includes accessing, at the hosted storage service, the metadata stored in association with the resource. The method further includes determining, at the hosted storage service and based on the metadata, that access permissions for the resource are controlled by the access control service. The method further includes in response to determining that access permissions for the resource are controlled by the access control service, sending an access request from the hosted storage service to the access control service, the access request identifying the resource and a user of the client system. The method further includes receiving, at the hosted storage service and from the access control service, an access response that indicates the user is permitted to access the resource. The method further includes in response to receiving the access response, sending the resource from the hosted storage service to the client system.

Implementations can include any, all, or none of the following features. The access control service can maintain an access control list that defines who is authorized to perform actions on resources, and the nature of the permitted actions. The access control service may be subject to a different administrative control than the hosted storage service. The resource may be encrypted by a content provider with a first key before the resource is received at the hosted storage service. The method may includs receiving, at the hosted storage service, the first key encrypted with a client key; and sending, by the hosted storage service and to the client system, the first key encrypted with the client key for decryption by the client using the client key. The first key encrypted with a client key may be received from an access keystore that is subject to a different administrative control than the hosted storage service and subject to a different administrative control than the access control service. The first key may be provided to the client system from the content provider. The first key may be encrypted with a provider key and wherein the method further includes receiving, at the hosted storage service, the encrypted first key; and storing, at the hosted storage service and in association with the resource, the encrypted first key. The method may include; in response to receiving the access response, sending the encrypted first key from the hosted storage service to the client system. The metadata stored in association with the resource may include an access control list. The access control list may identify a user and access permission for the associated resource for the user. The hosted storage service may store a second resource in association with a second access control list which identifies a second user and a second access permission for the associated second resource for the second user. The method may include receiving, at the hosted storage service, a validation of the access control service indicating that the access control service may be used for authorizing access to the resource. Receiving a request to access the stored resource may include receiving authentication information agreed upon by client system and the access control service; and wherein sending an access request to the access control service may include sending the authentication information.

In one aspect, a computer system includes a hosted storage service configured to receive a resource and a request to store the resource, the request includes a location of an access control service. The access control service is separate from the hosted storage service and controls access permissions for the resource. The hosted storage service is further configured to store the resource in association with metadata that indicates the location of the access control service. The hosted storage service is further configured to receive a request to access the stored resource. The hosted storage service is further configured to access the metadata stored in association with the resource. The hosted storage service is further configured to determine, based on the metadata, that access permissions for the resource are controlled by the access control service. The hosted storage service is further configured to, in response to determining that access permissions for the resource are controlled by the access control service, send an access request to the access control service, the access request identifying the resource and a user of the client system. The hosted storage service is further configured to receive, from the access control service, an access response that indicates the user is permitted to access the resource. The system further includes in response to receiving the access response, send the resource from the hosted storage service to the client system. The system further includes a client system configured to send, to the hosted storage service, the request to access the stored resource. The client system is further configured to receive from the hosted storage service, the resource. The system further includes an access control service configured to receive, from the hosted storage service, the access request. The access control service is further configured to send, in response to receiving the access request, the access response.

Implementations can include any, all, or none of the following features. The access control service can maintain an access control list that defines who is authorized to perform actions on resources, and the nature of the permitted actions. The access control service may be subject to a different administrative control than the hosted storage service. The system may further include a content provider configured to encrypt the resource with a first key; and send, after encrypting the resource, the resource to the hosted storage service. The system may be configured to encrypt the first key with a client key; and send, to the hosted storage service, the first key encrypted with the client key; the hosted storage service further configured to: receive the first key encrypted with the client key; and send, to the client system, the first key encrypted with the client key; and the client system further configured to receive the first key encrypted with the client key. The system may further include an access keystore that is subject to a different administrative control than the hosted storage service and subject to a different administrative control than the access control service, the access keystore configured to send, to the hosted storage service, the first key encrypted with a client key to the hosted storage system; and the hosted storage service further configured to receive the first key encrypted with a client key. The system may be configured to send, to the client system, the first key; and the client system is further configured to receive the first key. The first key may be encrypted with a provider key and wherein the hosted storage service is further configured to receive the encrypted first key; and store the encrypted first key in association with the resource. The hosted storage service may be further configured to send the encrypted first key to the client system in response to receiving the access response. The metadata may be stored in association with the resource includes an access control list. The access control list may identify a user and access permission for the associated resource for the user. The system may be configured to store a second resource in association with a second access control list which identifies a second user and a second access permission for the associated second resource for the second user. The hosted storage service may be further configured to receive a validation of the access control service indicating that the access control service may be used for authorizing access to the resource. The system may be configured to receive authentication information agreed upon by client system and the access control service; and wherein to send an access request to the access control service, the hosted storage service is configured to send the authentication information.

Implementations may include one or more of the following advantages. Delegating authorization to another system can enable a hosted storage system to provide flexible and extensible data service models. By delegating authorization requests, the hosted storage system can serve resources to users based on secret or unknown factors. That is, a user's financial information does not need to be provided to the hosted storage system for a resource purchased by the user. Only a message from a resource owner that indicates the user is authorized to receive the resource may be needed. A third party authorization service can be used to ensure trusted data escrow. Encrypted resources and encryption keys can be used to ensure that a content provider and client have access to the resource in plaintext form, but the hosted storage system does not.

The details of one or more implementations are set forth in the accompanying drawings and the description below. Other features and advantages will be apparent from the description and drawings, and from the claims.

DETAILED DESCRIPTION

A hosted storage system can specify a pre-response callout for authentication and/or authorization of an access request. Metadata associated with a resource can specify an access control service and a collection of parameters to be used to determine whether a user is authorized to access the resource. The access control service is separate from the hosted storage service and may be subject to a different administrative control than the hosted storage service. The access control service may determine authorization based on information or logic that is unavailable to the hosted storage service.

Figure 1:
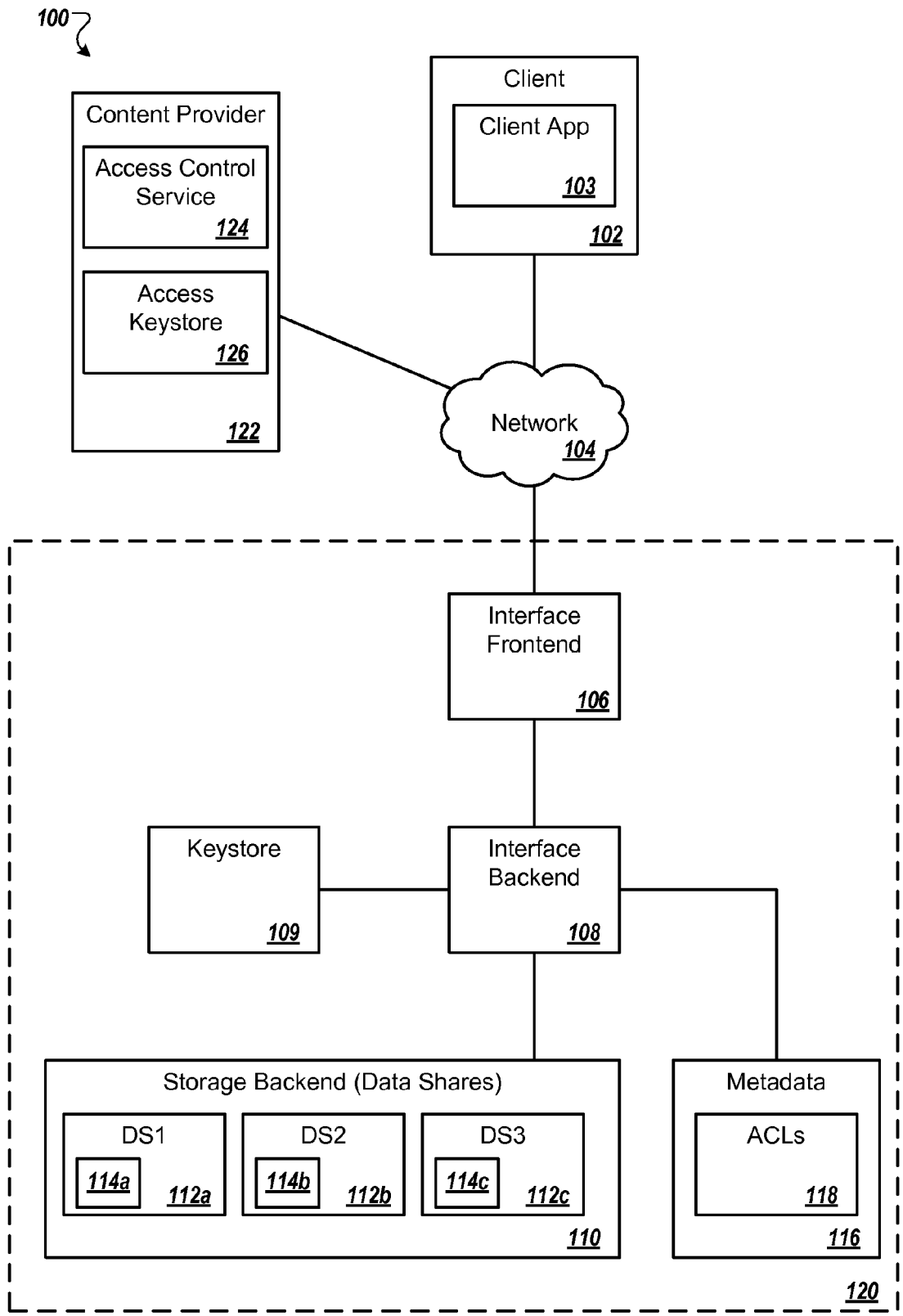
FIG. 1 is a block diagram showing an example of a system for providing hosted storage, authorizing access, and accessing the hosted storage from a client device.

FIG. 1 is a block diagram showing an example of a system 100 for providing hosted storage, authorizing access, and accessing the hosted storage from a client device 102. In some implementations, a hosted storage service 120 can provide access to stored data by applications running on computing devices geographically separate from each other, provide off-site data backup and restore functionality, provide data storage to a computing device with limited storage capabilities, and/or provide storage functionality not implemented on a computing device. In some implementations the hosted storage service 120 can use an access control service 104 to authenticate and/or authorize requests to access resources stored in the hosted storage service 120

The system 100 can provide scalable stores for storing data objects. The client device 102 can upload data objects to the hosted storage service 120 and specify access to the uploaded data objects. Access control can include a range of security levels, from keeping data securely confidential to publishing it without restrictions. Data stored in hosted storage service 120 can be secured from unauthorized access. The hosted storage service 120 can use a simple and consistent application programming interface, or API, which can allow arbitrary quantities of structured or unstructured data to be kept private or shared between individuals, organizations, or with the world at large. The client device 102 can store data in the hosted storage service 120 for mutual business reasons (e.g., submission of work product ordered by the owner of the hosted storage service 120), or for use in data processing by other services (e.g., images uploaded are used to automatically and dynamically create a photo gallery web page.)

Figure 7:
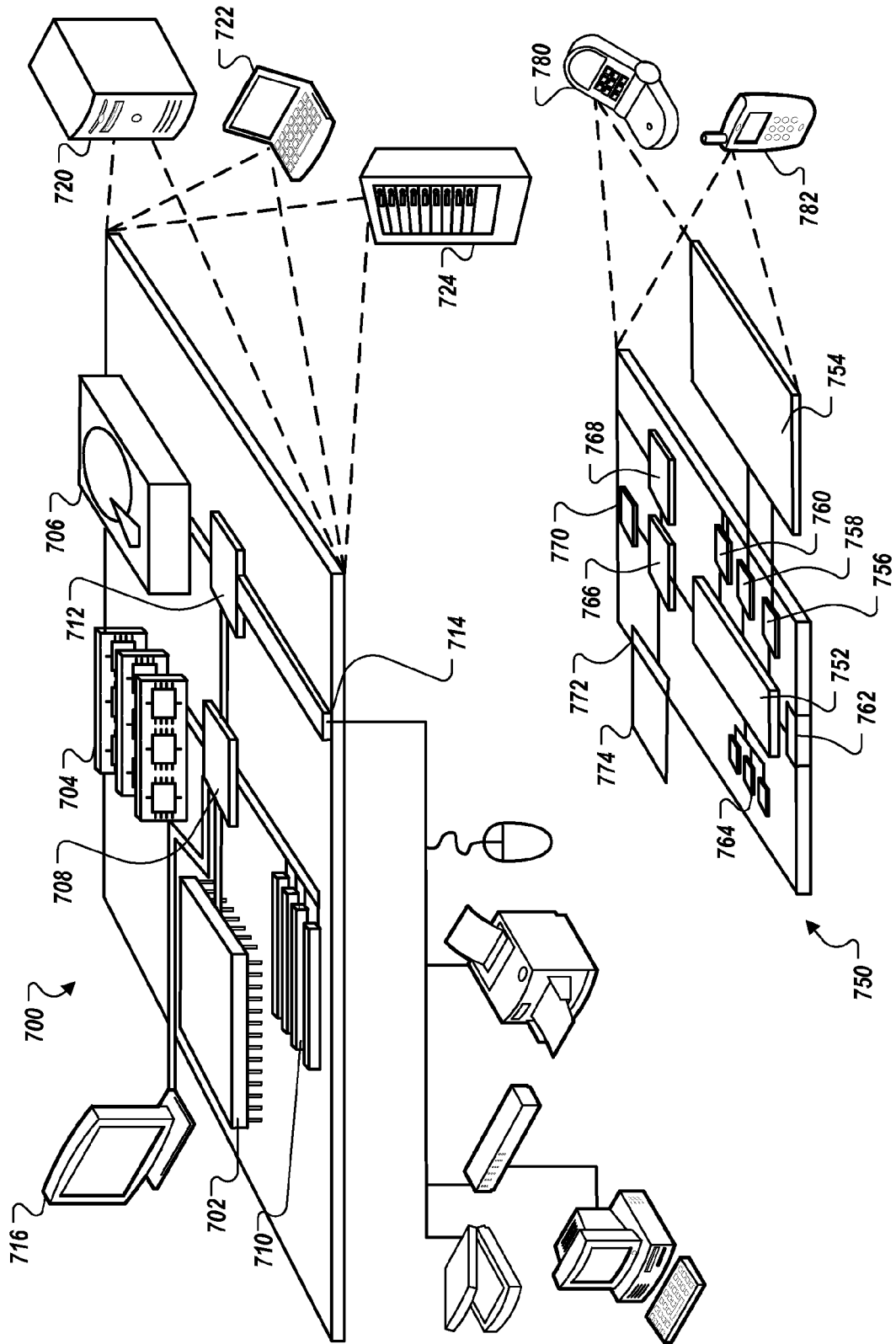
FIG. 7 shows an example of a computing device and a mobile computing device.

The client device 102 can be implemented using a computing device, such as the computing device 700 or the mobile device 750 described with respect to FIG. 7. The client device 102 can communicate with the hosted storage service 120 via a network 104, such as the Internet. The client device 102 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single client device 102 is shown, there can be multiple client devices communicating across the network 104 with the hosted storage service 120 and/or other services and devices.

The hosted storage service 120 can be implemented such that client applications such as a client application 103 can store, retrieve, or otherwise manipulate data objects in the hosted storage service 120. The hosted storage service 120 can be implemented by one or more server devices, which can be implemented using a computing device, such as the computing device 700 or mobile device 750 described with respect to FIG. 7. For example, the hosted storage service 120 can be implemented by multiple server devices operating in the same, or different, data centers.

The hosted storage service 120 generally includes an interface frontend 106, an interface backend 108, a storage backend 110, metadata 116 for objects stored in the storage backend 110, and a keystore 109. In general, the interface frontend 106 may receive requests from and send responses to the client device 102. For instance, the hosted storage service 120 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface.

An interface frontend 106 can receive messages from the client 102 and parse the request into a format usable by the hosted storage service 120, such as a remote procedure call (RPC) to an interface backend 108. The interface frontend 106 writes responses generated by the hosted storage service 120 for transmission to the client 102. In some implementations, multiple interface frontends 106 are implemented, for example to support multiple access protocols.

The interface frontend 106 can include a graphical front end, for example to display on a web browser for data access. The interface frontend 106 can include a sub-system to enable managed uploads and downloads of large files (e.g., for functionality such as pause, resume, and recover from time-out). The interface frontend 106 can monitor load information and update logs, for example to track and protect against denial of service (DOS) attacks.

As described above, the Web Service API may be a REST-based HTTP interface. In a REST-based interface, a data object is accessed as a resource, uniquely named using a URI, and the client application 103 and service 120 exchange representations of resource state using a defined set of operations. For example, requested actions can be represented as verbs, such as by HTTP GET, PUT, POST, HEAD, and DELETE verbs. The GET verb may be used to retrieve an object, while the HEAD verb may be used to retrieve information about an object without retrieving the object itself. The DELETE verb may be used to delete an object from the hosted storage service 120. The PUT and POST verbs may be used to upload an object to the service 120. PUT requests can come from the client 102 and contain authentication and authorization credentials and object metadata in a header, such as an HTTP header. POST requests can be received when a client 102 wants to upload from a web browser form. The form POST upload protocol for the hosted storage service 120 can involve multiple required form fields to provide authentication, authorization and object metadata. More generally, any of the API requests may include credentials for authentication and authorization, for example, in a header of the request. For example, an authorization header may be included in the REST requests, which includes an access key to identify the entity sending the request.

Alternatively, or additionally, a user can be authenticated based on credentials stored in a browser cookie, which gets appended to the API requests. If no valid cookie is present, a redirect to an authentication frontend can be generated, and the authentication frontend can be used to generate the browser cookie. The authentication frontend can be used by systems and services in addition to the hosted storage service 120 (e.g., if the organization operating the hosted storage service 120 also operates other web services such as email service.) A user can also or alternatively be authenticated based on authentication credentials from an external credentialing service or an external service that includes credentialing functionally. User or group identifier information can be calculated from the external service's credential information. Requests sent by the client 102 to the interface frontend 106 can be translated and forwarded to the external service for authentication.

In general, objects stored in the hosted storage service 120 can be referenced by object identifiers. The hosted storage service 120 can define namespaces to which a valid object identifier must conform. For example, the namespace may require that object identifiers be a sequence of Unicode characters whose UTF-8 encoding is at most 1024 bytes long. As another example, the namespace may require that object identifiers be globally unique identifiers (GUIDs), which may be 128-bit integers.

Objects can be stored in hosted storage service 120 in buckets. In some examples, each bucket is uniquely named in the hosted storage service 120, each object is uniquely named in a bucket, and every bucket and object combination is unique. Objects may be uniquely identified by a URI that includes the bucket name and the object name, and identifies the hosted storage service 120. For example, an object named "long/song.mp3" in a bucket named "music" could be specified using a URI pattern such as http://s.[anyexampledomain].com/music/long/song.mp3 or http://music.s.[anyexampledomain].com/long/song.mp3. Alternatively, the user of the client 102 can create a bucket named www.[secondexampledomain], publish a CNAME alias redirecting that to http://music.s.[anyexampledomain].com, and address the object as http://www.[secondexampledomain]/long/song.mp3. In some examples, buckets do not nest.

The interface backend 108 can handle or pass request authentication and authorization, can manage data and metadata, and can track activity such as for billing. The interface backend 108 can provide functionality for independent frontend/backend scaling for resource utilization and responsiveness under localized heavy loads. Data management can be encapsulated in the interface backend 108 while communication serving can be encapsulated in the interface frontend 106. The interface backend 108 can isolate security mechanisms from the client-facing interface frontend 106.

The interface backend 108 can expose an interface usable by both the interface frontend 106 and other systems. In some examples, some features of the interface backend 108 are accessible only by an interface frontend (not shown) used by the owners of the hosted storage service 120 (internal users). Such features can include those needed for administrative tasks (e.g., resolving an object reference to a low level disk address.) The interface backend 108 can handle request authentication (e.g., ensuring a user's credentials are valid) and authorization (e.g., verifying that a requested operation is permitted) or can pass authentication and/or authorization to an access control service 124. The interface backend can also provide encryption and decryption services to prevent unauthorized access to data, even by internal users.

A keystore 109 can store encryption keys for data objects, where the encryption keys have themselves been encrypted by the interface backend 108. The encrypted keys can carry associated metadata that is cryptographically bound to the key itself, and are referred here to as wrapped keys. From the point of view of the interface backend 108, the wrapped keys can be opaque objects. To obtain the cleartext key of a wrapped key for use (e.g., to encrypt or decrypt a data object), the interface backend 108 can provide the wrapped key and client authentication credentials to the keystore 109. The keystore 109 can verify, based in part on the wrapped key's metadata, that the provided authentication credential is sufficient to authorize release of the key, and if so, can return the unwrapped key to the interface backend 108. The interface backend 108 can use the key to encrypt or decrypt the data object and then can discard the key.

In some examples, the encryption key is a symmetric key that can be used to both encrypt and decrypt an object. In some examples, a wrapped key can have associated metadata indicating multiple users or groups authorized to access the cleartext key. In some examples, the keystore 109 can copy a wrapped key and rewrap the key for a different principle (e.g., containing different metadata).

The interface backend 108 can manage metadata 116 associated with data objects, for example in a structured data format such as a database (e.g., MySQL). User-specified names labeling the buckets can be completely defined within the metadata 116, and object metadata 116 can map a resource name to one or more data shares 112 storing the resource. The metadata 116 can also contain bucket and object creation times, object sizes, hashes, and access control lists 118 (ACL 118) for both buckets and objects. The interface backend 108 can log activity and track storage consumption to support accounting for billing and chargebacks. In some examples, this includes quota monitoring in each dimension in which customers are charged (e.g., reads, writes, network transfers, total storage in use.)

The ACLs 118 define who is authorized to perform actions on corresponding buckets or objects, and the nature of the permitted actions. The ACLs 118 can be an unordered list of {scope, role} pairs, plus Boolean flags. The scope may define a user or group of users, and the role may define the access permissions for the user or group. In some examples, the union of all {scope, role} pairs can define access rights. In some examples, more specific {scope, role} pairs override more general ones. Table 1: Bucket Roles below shows a list of example roles that can be included in ACLs 118 for buckets. Table 2: Object Roles below shows a list of example roles that can be included in ACLs 118 for data objects.

TABLE 1

Bucket Roles

| Role | Capabilities |
|---|---|
| READ | Can list the bucket's contents. Cannot create or delete objects. |
| WRITE | READ capabilities plus ability to create and delete objects in the bucket. |
| FULL_CONTROL | WRITE capabilities plus ability to read and write the bucket ACL. |

TABLE 2

Object Roles

| Role | Capabilities |
|---|---|
| READ | Can read the object. |
| FULL_CONTROL | READ capabilities plus ability to read and write the object ACL. |

Scopes can be defined to a single user or a group of users. In one implementation, those users with a FULL_CONTROL role (and therefore able to modify the ACL for a given bucket or object) may define a group of users, and then provide a role for the group. For example, a group of users may be managed by the hosted storage service 120 (or, more generally, by the service provider that provides the hosted storage service 120) for reasons other than storage permissions (for example, for a message board or other service that employs groups) and those groups may be identified by a single username or other identifier associated with the group of users, an e-mail address associated with the group of users (which may or may not also correspond to an identifier of the group), or a domain name associated with a group. This may allow a user to specify a preexisting group managed by the service provider that is already defined by the identifier, e-mail address, or domain name. Similarly, users may be able to specify a group of users (for example, by user id or e-mail address) and associate an access key with the group. This may allow for the formation of ad-hoc groups for the management of storage permissions, rather than groups already managed by the service provider.

In this way, a group of users can be given a particular role simply by managing the role of the group. Similarly, if the ACL is associated with a bucket containing a number of objects, or the ACL is otherwise associated with multiple objects, the role with respect to those objects can be easily changed by simply changing the role of the group.

Table 3: Scopes below shows a list of example scopes that can be included in ACLs 118 for buckets and/or data objects.

TABLE 3

Scopes

| Name | Description |
|---|---|
| Service ID | A single authenticated user specified by username. |
| Email Address | A single user specified by an email address. |
| Service Group ID | A group of users managed by the hosted storage service 120 and specified by an associated identifier. |
| Invite Token | One or more users with access to a one time use digital token. |
| Group-Restricted Key | One or more users with access to a permanent use digital key. |
| All Service Users | All authenticated users of the hosted storage service 120. |
| All Users | All users, no authentication. Can be anonymous or semi-anonymous. |

The FULL_CONTROL role can represent all possible capabilities, such as those assigned to an object or bucket owner connected to a financially responsible party. The bucket owner can be configured to always have FULL_CONTROL for the bucket. In general, the bucket and/or object owner can create or modify scopes and roles in the corresponding ACLs, but in some implementations the pair {bucket owner, FULL_CONTROL} may be prevented from being removed from the bucket ACL 118 (or the object ACL). To create an object, a user can have write permission on the bucket, which can be granted by WRITE and FULL_CONTROL. WRITE permission on the bucket can imply permission to delete or overwrite an object in the bucket. Additional constraints can disallow certain modifications to ACLs 118. In some examples, it is possible to create an object that the bucket owner cannot read.

Additionally or alternatively to the {scope, role} format ACLs 118, some ACLs 118 can reference one or more access control services 124 that can determine a user's authorization to perform actions on corresponding buckets or objects. These remote-authorization ACLs 118 can contain a reference, such as a URI, to an access control service 124. When the interface backend 108 encounters a remote-authorization ACL 118 while attempting to authorize an access to a data object, the interface backend 108 can pass an authorization request to the access control service 124 referenced in the remote-authorization ACL 118. Parameters that need to be sent to the access control service 124 for the service 124 to perform authorization, as well as the possible parameters that may be received in response, can be specified in metadata 116 associated with the requested object. In some cases, these parameters may be included in the remote-authorization ACLs 118. Listed below is one example set of parameters that can be stored in the metadata 116 and/or remote-authorization ACLs 118.

```
{"AuthenticationRequest": {
    "operation": "read",
    "bucket": "mybucket",
    "object":"myobject",
    "authentication":"authentication token",
    "timestamp":"1318620440000",
    "metadata": {
        "application_metadata": [
            {"name": "userfield1", "value": "document name"},
            {"value": "userfield2", "value": "something else"}
        ]
    }
}}
{"AuthenticationResponse": {
    "grant_access":"false",
    "error_details":"Permission denied"
    }
}
```

The access control service 124 can receive and examine the authorization request, and return a message to the interface backend 108 indicating permission or denial of the access attempt. Some access control services 124 can maintain an ACL list that is formatted similar to the {scope, role} ACLs 118.

The access control service 124 can be implemented using a computing device, such as the computing device 700 or the mobile device 750 described with respect to FIG. 7. The access control service 124 can communicate with the hosted storage service 120 via a network 104, such as the Internet. The access control service 124 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single access control service 124 is shown, there can be multiple access control service 124s communicating across the network 104 with the hosted storage service 120 and/or other services and devices.

The access control service 124 is separate from the hosted storage service 120 and may be subject to a different administrative control than the hosted storage service 120. For example, the access control service 124 may be owned and operated from an entity (such as a company) that is different than the one that owns and operates the hosted storage system 120. Alternatively, the hosted storage system 120 and access control service 124 may be owned by the same entity, but be controlled by two separate parts of the entity (such as different business units) such that the hosted storage system 120 and access control service are under different administrative controls.

As one example, the access control service 124 may be associated with a content provider 122 that generates data objects and uploads them to the hosted storage service 120. One example content provider 122 is a musician or record label using an access control service 124 to process sales and authorization of access to music files stored in the hosted storage service 120. While the access control service 124 is shown here as a component of a content provider 122, the access control service 122, and the hosted storage service 120 may be separate logically, communicably, and/or administratively.

An access keystore 126 can store encryption keys to be used in conjunction with the access authorization provided by the access control service 124. For example, the access control keystore 126 may store one or more data object encryption keys for use in decrypting data objects whose authorization has been granted by the access control service 124. In some cases, the access keystore does not store any data object encryption keys, but instead unwrapped data object encryption keys.

The access keystore 126 can be implemented using a computing device, such as the computing device 700 or the mobile device 750 described with respect to FIG. 7. The access keystore 126 can communicate with the hosted storage service 120 and/or the access control service 124 via a network 104, such as the Internet. The access keystore 126 can communicate across the network using communication protocols such as, for example, one or more of Transmission Control Protocol/Internet Protocol (TCP/IP), Hypertext Transfer Protocol (HTTP), Secure Shell Remote Protocol (SSH), or Application Program Interfaces (API). While only a single access keystore 126 is shown, there can be multiple access keystores 126 communicating across the network 104 with the hosted storage service 120 and/or other services and devices.

Although shown as a component of the content provider 122 along with the access control service 124, the relationship between access keystore 126 and access control service 124 may take other forms. For example, the access keystore 126 may be a component of the access control service 124. In another example, the access control service 124 may be separate from the access keystore 126 and may be subject to a different administrative control than the access keystore 126. This may be desirable, for example, to prevent access to the data objects in the event that one of the access control service 124 or the access keystore 126 is compromised.

The storage backend 110 can contain multiple datastores 112a-112c. Although three datastores 112 are shown, more or fewer are possible. Each of the datastores 112a-112c can store data objects 114a-114c in a particular format. For example, data store 112a can store a data object 114a as a Binary Large Object (BLOB), data store 112b can store a data object 114b in a distributed file system (e.g., Network File System), and data store 112c can store a data object 114c in a structured data format such as a database (e.g., MySQL.)

Figure 2:
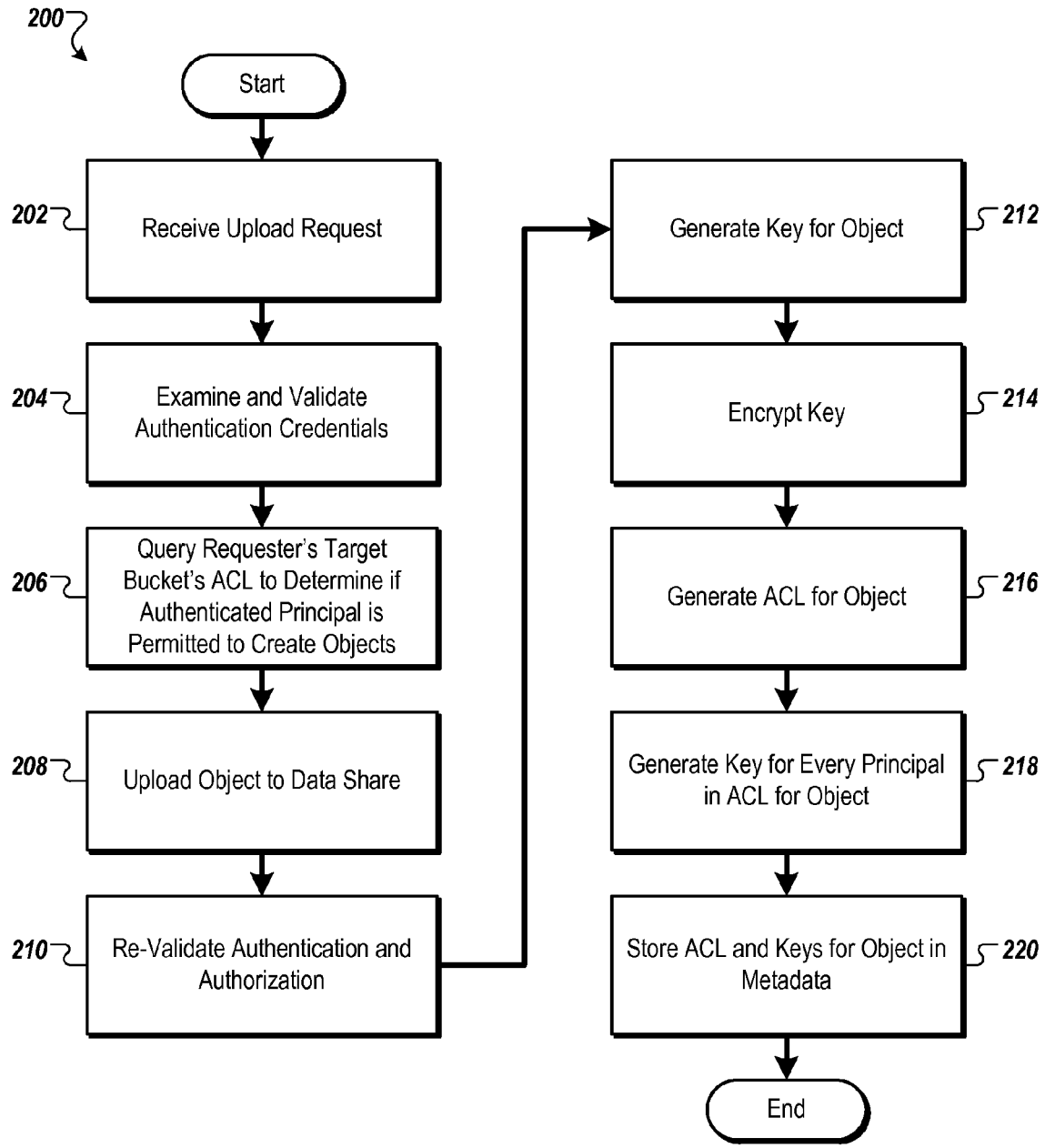
FIG. 2 is a flow chart showing an example of a process for storing data in a hosted storage service.

FIG. 2 is a flow chart showing an example of a process 200 for storing data in a hosted storage service. The process 200 can be performed by, for example, the interface frontend 106 and the interface backend 110, and for clarity of presentation, the description that follows uses the system 100 as the basis for describing the process. However, another system, or combination of systems, may be used to perform the process 200.

A request is received by the interface frontend 106 from the client application 103 to store an object (202). The request can include a HTTP PUT or POST request, an authentication credential that authenticates the principal (entity) making the request, a data object, and a target for the object consisting of a bucket and data object name. In some examples, the authentication credentials can include an interoperable authentication header, token, or cookie. The interface frontend can make a RPC to the backend 108 including the request headers.

The interface backend 108 can examine and validate the authentication credentials (204). For example, native credentials (e.g., user ID, token) can be validated using internal validation features of the hosted storage service 120. External credentials (e.g., user names and passwords for another system) can be sent to the associated external system for validation.

The interface backend 108 can query the request's target bucket's ACL 118 to determine if the authenticated principal is permitted to create an object in the bucket (206). For example, the principal or a group the principal is a member of can have the WRITE or FULL_CONTROL role assigned in the bucket's ACL 118, which would allow the principal to create an object in the bucket. If the principal is not authorized to create an object, the request is denied.

Otherwise, the interface backend 108 uploads the object to the target bucket with the target data object name to a datastore 112 (208). In some examples, each bucket is associated with only a single datastore 112, and specifying a target bucket specifies a datastore 112. In some examples, the interface backend 108 can examine the data object or use a parameter in the RPC from the interface frontend 106 to determine which datastore 112 to store the object in, with associated metadata 116 indicating the location of the object (that is, the particular datastore the object is stored in and the object's location in that datastore).

The interface backend 108 re-validates the principal's authentication and authorization (210). To support long-running uploads, expiry times of authentication credentials can be temporarily ignored.

The interface backend 108 generates a new document key request to the keystore 109 for a wrapped key for the newly-uploaded object (212). The new wrapped key is tied to the authentication credentials of the principal of the request. The keystore 109 can also supply an encryption key to encrypt the wrapped key. The interface backend 108 encrypts the wrapped key (214).

The interface backend 108 creates an ACL 118 representing the access control list for the newly created object (216). In some example, a default ACL 118 is used or an ACL 118 can be specified by the request from the client 102.

The interface backend 108 generates a new document key request to the keystore 109 for a wrapped key for every principal (user or group) in the ACL 118 with permissions to read the object or modify the object's ACL 118. Each new wrapped key is tied to a single principal. The keystore 109 can also supply an encryption key to encrypt the wrapped keys, or the interface backend 108 can reuse the encryption key from the step 108.

The interface backend 108 stores the object's ACL 118 and wrapped keys in the object's metadata 116. The encryption key or keys can be discarded by the interface backend 108.

Figure 3:
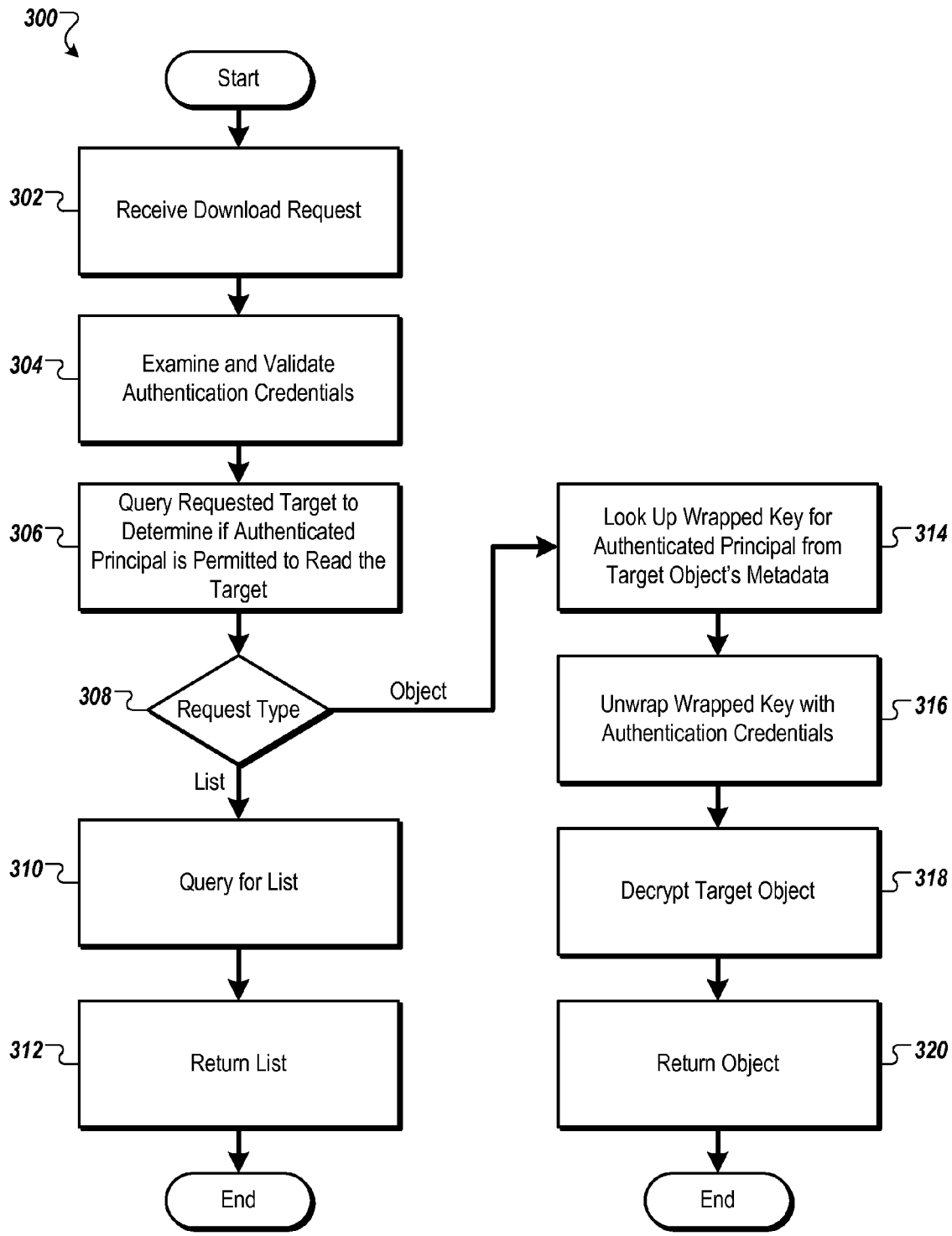
FIG. 3 is a flow chart showing an example of a process for providing data in a hosted storage service.

FIG. 3 is a flow chart showing an example of a process for providing data in a hosted storage service. The process 300 can be performed by, for example, the interface frontend 106 and the interface backend 110, and for clarity of presentation, the description that follows uses the system 100 as the basis for describing the process. However, another system, or combination of systems, may be used to perform the process 300.

A request is received by the interface frontend 106 from the client application 103 to download an object (302). The request can include a HTTP GET request, an authentication credential that authenticates the principal (entity) making the request, and a target consisting of a bucket (and optionally data object) name. In some examples, the authentication credentials can include an interoperable authentication header, token, or cookie. The interface frontend can make a RPC to the backend 108 including the request headers.

The interface backend 108 examines and validates the authentication credentials included in the request (304). For example, native credentials (e.g., user ID, token) can be validated using internal validation features of the hosted storage service 120. External credentials (e.g., user names and passwords for another system) can be sent to the associated external system for validation.

The interface backend 108 queries the request's bucket or object ACL 118 to determine if the authenticated principal is permitted to read the target (306). For example, the principal or a group the principal is a member of can have the READ, WRITE or FULL_CONTROL role assigned, which would allow the principal to read or otherwise access the target. If the principal is not authorized to read or access the object, the request is denied.

Otherwise, the interface backend 108 determines if the request is for a bucket or for an object (308). If the request is for a bucket, the interface backend 108 queries for a list of the bucket's contents (310) and the listing is returned to the client application 103 (312).

If the request is for an object, the interface backend 108 looks up the appropriate wrapped key for the given authenticated requestor from the object's metadata 116 (314). The interface backend 108 sends the wrapped key and the authentication credentials to the keystore 109, which can return the decrypted object encryption key to the interface backend 108 (316). The interface backend 108 can fetch and decrypt the target object (318) to be returned to the client application 103 (320).

Figure 4:
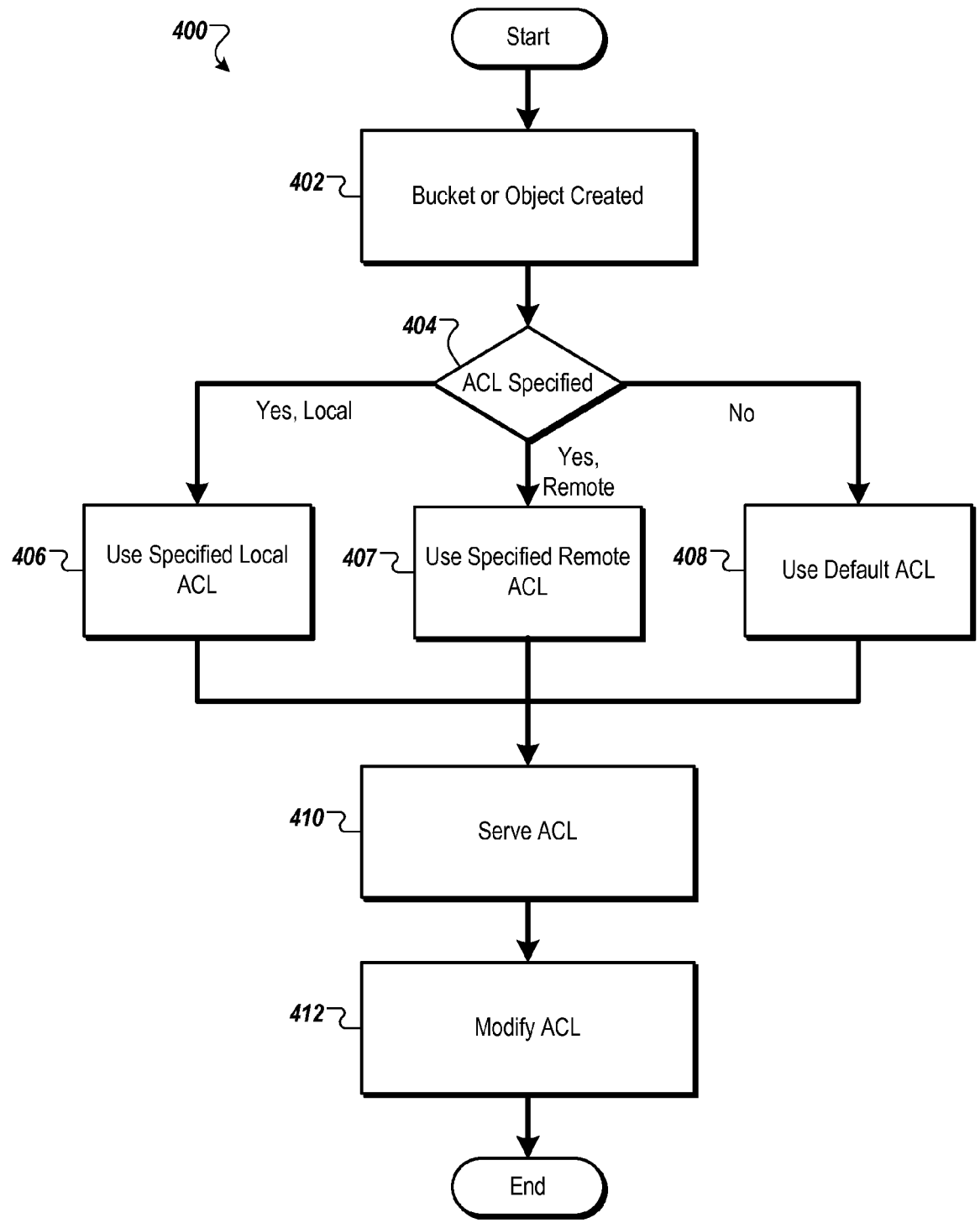
FIG. 4 is a flow chart showing an example lifecycle of an access control list.

FIG. 4 is a flow chart showing an example lifecycle 400 of an ACL 118. Although the steps of the lifecycle 400 show an order of steps, it is not implied that each step leads directly to another. The steps shown are a listing of possible steps that may be performed on an ACL 118 in roughly chronological order. The actual order, number, and kind of steps will be dependent on implementation details and usage of the hosted storage system 120.

A bucket or object is created by the backend interface 108 based on requests from the client application 103 (402). The client request can include a bucket name, an object name, and/or an ACL 118. The principal requesting the new bucket or object is authenticated and made the owner of the bucket or object.

If a local ACL 118 is specified in the request (404), the specified local ACL 118 is associated with the bucket or object (406). If the specified ACL 118 does not include a {scope, role} pair specifying the principal having FULL_CONTROL, one such {scope, role} pair can be added to the ACL 118. In one implementation, an ACL may be specified in a request by enumerating each scope and role pair to be included in the ACL, or may be specified by reference to the name of a pre-specified or "canned" local ACL. A list of pre-specified or 'canned' local ACLs 118 is shown in Table 4 Canned ACLs below. The canned local ACLs 118 can be cataloged by the hosted storage system 120 and referenced by the client application 103 by name, rather than requiring the request enumerate each scope and role pair.

TABLE 4

| Canned ACLs | |
| --- | --- |
| Canned Local ACL Name | {scope, permission} |
| private | {creating user or bucket owner, FULL_CONTROL} |
| public-read | {all users, READ} {bucket owner, FULL_CONTROL} |
| public-read-write | {all users, WRITE} {bucket owner, FULL_CONTROL} |

TABLE 4-continued

Canned ACLs

| Canned Local ACL Name | {scope, permission} |
|---|---|
| authenticated-read | {all authenticated users, READ} |
|  | {bucket owner, FULL_CONTROL} |
| bucket-owner-read | {bucket owner, READ} |
| [for objects only] | {object owner, FULL_CONTROL} |
| bucket-owner-full-control | {bucket owner, FULL_CONTROL} |
| [for objects only] | {object owner, FULL_CONTROL} |

If a remote ACL 118 is specified in the request (404), the specified remote ACL 118 is associated with the bucket or object (407). In one implementation, an ACL may be specified in a request by listing the network location of the access control service 124, or may be specified by reference to the name of a pre-specified or "canned" remote ACL. The canned remote ACLs may each contain the network location of access control services 124 that are trusted, canonical, or otherwise known to many potential resource uploaders.

If an ACL 118 is not specified in the request (404), a default local ACL 118 can be used (408). For example, bucket and object creation can default to the "private" local canned ACL 118 for authenticated users. For object creation by unauthenticated users, such as for new objects created in a "public-read-write" bucket, a default of "bucket-owner-full-control" can be used.

An ACL 118 can be served, for example, to a principal with READ, WRITE, or FULL_CONTROL of the associated bucket or object, or to a principal that has been authorized by the access control service 124 (410). For example, a client application 103 can perform a HTTP GET to a target's URI with the query string ?acl to retrieve the ACL associated with the target. The ACL 118 can be serialized and returned to the client application 103.

The serialization of a local ACL may be defined, for example, by the following extended Backus-Naur form. Non-terminals appear in sans serif italics, terminals appear in Courier Bold, { } denote zero or more repetitions, [ ] enclose optional entities, | separates alternatives, and ( ) denote grouping. The terminal symbols canonical-id, email-address, and domain are defined in English below:

*access-control-list*: <AccessControlList> *owner entries* </AccessControlList>
*owner*: <Owner> *id* </Owner>
*entries*: <Entries> *entry* { *entry* } </Entries>
*entry*: <Entry> ( *permission scope* | *scope permission* ) </Entry>
*permission*: <Permission> ( READ | WRITE | FULL_CONTROL ) </Permission>
*scope*: <Scope type=UserById> *id* </Scope>
  | <Scope type=UserByEmail> *email* </Scope>
  | <Scope type=GroupById> *id* </Scope>
  | <Scope type=GroupByEmail> *email* </Scope>
  | <Scope type=GroupByDomain> <Domain> *domain* </Domain> </Scope>
  | <Scope type=AllUsers/>
  | <Scope type=AllAuthenticatedUsers/>
*id*: <ID> *canonical-id* </ID> [ <Name> *text* </Name> ]
  | [ <Name> *text* </Name> ] <ID> *canonical-id* </ID>
*email*: <EmailAddress> *email-address* </EmailAddress> [ <Name> *text* </Name>]
  | [ <Name> *text* </Name> ] <EmailAddress> *canonical-id* </EmailAddress>
*text*: { printable character excluding < and > }
*canonical-id*: 64 hex digits
*email-address*: standard RFC 822 email address
*domain*: standard RFC 822 domain specification A canonical-id or an email-address can identify a user or a group. A canonical-id is the encrypted service id for the user or group. Email addresses are a convenience for specifying canonical ids. In some implementations, the ACLs returned from the system always contain canonical ids. The <Name>teXt</Name> element may be used for information purposes only such that it is otherwise ignored by the system, and the system does not return it if there is no public name associated with the user or group.

An example serialized local ACL 118 is shown below.

```
<AccessControlList>
<Owner>
<ID>a9a7b886d6fd24a52fe8ca5bef65f89a64e0193f23000e241bf9b1c61be666e9</ID>
<Name>chriscustomer</Name>
</Owner>
<Entries>
<Entry><Permission>FULL_CONTROL</Permission>
<Scope type=/UserById>
<ID>a9a7b886d6fd24a52fe8ca5bef65f89a64e0193f23000e241bf9b1c61be666e9</ID>
<Name>chriscustomer</Name>
</Scope>
</Entry>
<Entry><Permission>FULL_CONTROL</Permission>
<Scope type=UserById>
<ID>79a59df900b949e55d96a1e698fbacedfd6e09d98eacf8f8d5218e7cd47ef2be</ID>
<Name>Frank</Name>
</Scope>
</Entry>
<Entry><Permission>FULL_CONTROL</Permission>
<Scope type=UserById>
<ID>de019164ebb0724ff67188e243eae9ccbebdde523717cc312255d9a82498e394a</ID>
<Name>Jose</Name>
</Scope>
</Entry>
<Entry><Permission>READ</Permission><Scope type=AllUsers></Entry>
</Entries>
</AccessControlList>
```

An ACL 118 can be updated, for example by a principal with FULL_CONTROL of the associated bucket or object (412). In some examples, a client must read, modify, and write an ACL 118 in order to update an ACL 118. In this example, the ACL 118 is served (410) as part of modification (412). In some implementations, a client application 103 can send ACL update requests to the hosted storage system 120.

Figure 5:
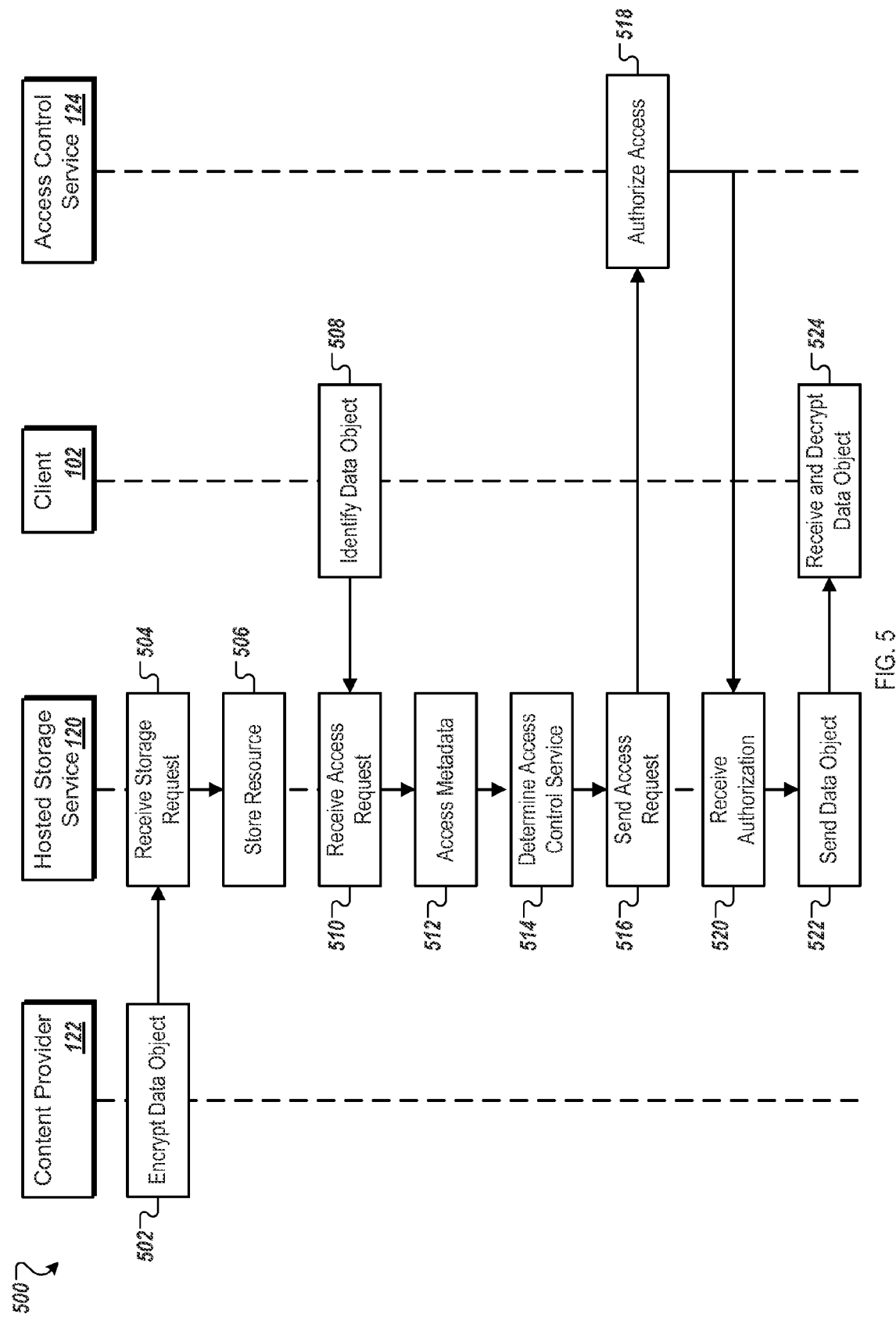
FIG. 5 is a swim lane diagram showing an example of a process for authorizing access to a resource.

FIG. 5 is a swim lane diagram showing an example of a process 500 for authorizing access to a data object. The process 500 can be performed by, for example, the system 100, and for clarity of presentation, the description that follows uses the system 100 as the basis for describing the process. However, another system, or combination of systems, may be used to perform the process 500. Message passing between networked computers, as described here and elsewhere, may be over a secure socket layer (SSL) channel or another format that can protect the messages from tampering and inspection by third parties.

The content provider 122 can encrypt a data object with an encryption key (502). For example, the content provider 122 may generate, purchase, or otherwise acquire a data object that is to be shared, rented, or sold to users or customers. Data objects of this type can include, but are not limited to, media files, scientific data-sets, personal communications, medical records, and business records.

In this example, this encryption key will be referred to as the data object encryption key. The data object encryption key described here is a symmetric encryption key. That is, a data object encrypted with the data object encryption key may be decrypted by anyone that knows the data object encryption key. However, other encryption schemes are possible, such as a public/private key system where a public key is used to encrypt a data object, but only a private can decrypt the data object.

The hosted storage system 120 can receive, from the content provider 122, a request to store the data object (504). The request includes a location of an access control service that is separate from the hosted storage service and that controls access permissions for the data object. The location can specify, for example, a URI for the access control service 124, a protocol to use when communicating with the control service 124, and parameters to send to the access control service 124. These parameters can include information such as information about a user requesting access authorization (e.g. user ID), the state of the hosted storage service 120 (e.g. timestamp of last request), and/or other information that may be used to determine authorization. In this example, the access keystore 126 is either not used, or is a component of the access control service 124. For clarity, communications between the access control service 124 and a keystore 126 are not shown. Other examples in which the access control service 124 and the access keystore 126 are separate entities are discussed below.

The hosted storage service 120 can store the data object in association with metadata that indicates the location of the access control service (506). The hosted storage service 120 can store this data in metadata 116. An example scheme for this storage is discussed with respect to FIG. 6, below.

The client 102 can identify a data object in the hosted storage system 120 to access (508). For example, the client 102 can receive information about the data object from the content provider 122. A web browser on the client 102 may be browsing the content provider's 122 website and select a link that has an embedded reference to the hosted data object. As a result, the client 102 can send a request to the hosted storage service 120 to access the object.

The hosted storage service 120 can receive, from the client 102, the request to access the stored data object (510). For example, the client 102 can send a HTTP GET or HEAD message referencing the data object to the hosted storage service 120, as previously described. The hosted storage service 120 can parse the request and identify the referenced data object.

The hosted storage service 120 can access the metadata stored in association with the data object (512). The metadata can store, among other information, information about the authentication and/or authorization scheme used for the associated data object. The hosted storage service 120 can determine, from the metadata, that a remote access control service determines access authorization for the data object (514). The hosted storage service 120 can also identify information in the metadata about the authorization request to send to the access control service 124, including but not limited to, the location of the access control service 124.

In some implementations, the hosted storage service 120 can receive a validation of the access control service 124 that indicates that the access control service may be used for authorizing access to the data object. This validation may be received as part of determining the access control service 514, or at some previous point. Some schemes for validation of the access control service 124 are described later in this document.

In response to determining that the access permissions for the resource are controlled by the access control service 124, the hosted storage service 120 can send an access request to the access control service 124. The access request can include identifying information about the data object requested, and about the user of the client 102 that requested access. Some or all of this information may be specified by the parameters listed in the location information, and/or some or all of this information may be provided in all access requests generated by the hosted storage service 120.

In some implementations, the information that identifies the user of the client 102 may be an authentication token created by the hosted storage service 120, or by a system used by the hosted storage service 120 for user authentication. Here, the user would have been authenticated and known by the hosted storage service 120 prior to, or as part of, the request to access the data object. The authentication token, or other data if a different authentication scheme is used, is provided by the hosted storage service 120 to the access control service 124 as an indication that the request is originating a user that has been authenticated by the hosted storage service 120.

Alternatively, the information that identifies the user of the client 102 may be copied from the request to access the stored resource. For example, the request to access the stored resource may include a header with authentication information (e.g. user name and password) used by the access control service 124. This authentication information may be hashed, encrypted, or otherwise obfuscated to be hidden from the hosted storage service 120.

The access control service 124 can receive the access request from the hosted storage service 120 and can authorize the access (518). In some implementations, the authorization process used by the access control service 124 may be unknown by the hosted storage service 120. That is, the access control service 124 need not report or register the logic or process used to determine authorization. This can permit, for example, the access control service to change, extend, add, and/or terminate authentication processes without reporting to the hosted storage service 120. In addition to the information contained in the access request, the access control service 124 may also use information for authorization that is not available to the hosted storage service 120. For example, the access control service 124 may process billing of the user for authorization without passing any user financial information through the hosted storage service 120.

In some implementations, the access control service 124 can receive a validation of the hosted storage service 120 that indicates that the hosted storage service 120 may be used for serving the data object to the client 102. This validation may be received as part of authorizing the access to the data object 518, or at some previous point. Some schemes for validation of the hosted storage service 120 are described later in this document.

The hosted storage service 120 can receive, from the access control service 124, an access response that indicates that the user is permitted to access the resource (520). In some implementations, the access response can include a bucket or object role, as previously described with regards to ACL 118 {scope, role} pairs. The access response can include a duration and/or access count that indicates that the user is authorized for a particular period of time and/or number of access. An access response may authorize a user for one logical operation, as determined by the access control service. For example, an access response may authorize a user for one GET and one PUT message, permitting one logical edit to the data object. In some implementations, this duration or count may reduce the number of access request sent from the hosted storage service 120 to the access control service 124.

In response to receiving the access response, the hosted storage service 120 can send the data object to the client 102 (522). For example, the hosted storage service 120 may transmit the data object to the client 102, as previously described. The client 102 can receive the data object from the hosted storage service 120 (524). Using the data object encryption key, the client 102 can decrypt the data object to access the data object's plaintext. Some schemes for key management where the client 102 and the content provider 122 have access to the data object encryption key are described later in this document.

Alternatively, the hosted storage service 120 can receive, from the access control service 124, an access response that indicates that the user is not permitted to access the resource. In some implementations, this type of access response may include a text string or denial code indicating the reason that the access control service 124 denied access (e.g. unrecognized user, failed billing attempt). The hosted storage service 120 may use this information in future processes, and/or may pass this information back to the client 102. In other implementations, the access response may not contain this type of information. For example, the access control service 124 may communicate a reason for denial directly to the client 102.

As described, the content provider 122 and the client 102 may both have copies of the data object encryption key used to encrypt and decrypt the data object. A number of schemes for key management are possible that ensure that both the client 102 and the content provider 122 have access to the data object encryption key while the hosted storage service 120 does not. A feature of such key management schemes is that the content provider and the client 102 can use the hosted storage service 120 for hosted storage without exposing the plain text of the data object to the hosted storage service 120. In some implementations, such as where the data object is not secret or sensitive, the encryption and key management need not be used. Described here are two key management schemes, but others are possible.

In one scheme, the content provider 122 can send the data object encryption key to the client 102 through a side channel, that is, through a communication channel that does not include the hosted storage service. For example, the content provider 122 may transmit the data object encryption key directly through the network 104, through email, parcel mail, verbally in person or telephonically. This scheme may be useful for situations in which the content provider 122 wishes to make all of its content, or all content within a particular category, available to the user of the client 102. One such example includes a personal accountant preparing reports and statements for a customer. The accountant is unlikely to charge per report, instead wishing the customer to be able to access any of the customer's documents if the customer has paid for the accountant's services.

In another scheme, the content provider 122 can provide to the user of the client 102, through a side channel, a client encryption key. This key is a symmetric encryption key unique to the user. Later, when the content provider 122 receives the access request identifying the user, the content provider 122 can encrypt the data object encryption key with the client encryption key. In this encrypted state, the data object encryption key cannot be used to decrypt the data object. In the access response from the access control service 124, the access control service 124 can include the encrypted data object encryption key. The hosted storage service 120 can pass this encrypted data object encryption key to the client 102, which can decrypt the encrypted data object encryption key with the client encryption key. This can allow the client 102 access to the data object encryption key for use in decrypting the data object. This scheme may be useful for situation in which the content provider 122 wishes to encrypt each data object with a different data object encryption key. That is, the content provider 122 does not wish to make all data objects available to the client 102. One such example includes a movie distributor selling access to movies to customers. A customer that purchases access to one movie in this scheme would not have access to the data object encryption keys for movies they did not purchase.

In the process 500, the access keystore 126 is either not used, or is a component of the access control service 124. In other example processes, the access keystore 126 may be used and may be a separate entity from the access control service 124. In one example, the client 102 may request the data object encryption key from the access keystore 126 after receiving the encrypted data object from the hosted storage service 120. In this case, the user may be authenticated by the access keystore 126, or a user's request may include information proving that the user was granted authorization to access the data object. This information may include, for example, a token provided to the client 102 by the access control service 124 or the hosted storage service 120, a cryptographic hash of the encrypted data object, and/or any other sort of appropriate information.

In another example in which the access keystore 126 may be used and may be a separate entity from the access control service 124, the hosted storage system 120 may request the data object encryption key from the access keystore 126. For example, after receiving the authorization message from the access control service 124, the hosted storage service can request the data object encryption key from the access keystore 126. The keystore 126 may return the data object encryption key in encrypted form, for example encrypted with the client key, to the hosted storage service 120. When the hosted storage service serves 120 the data object to the client, the hosted storage service can also provide the encrypted data object encryption key.

In addition to these key management schemes, there are key management schemes that support a stateless access control service 124 or stateless access keystore 126. By configuring a component to be stateless, the speed and scalability of the component can be improved compared to a stateful version of the component. In some of these stateless configurations, the access control service 124 or the access keystore 126 may need to store only one encryption key for the content provider 122.

In this scheme, the content provider 122 can encrypt a data object with a data object encryption key before storing the data objects in the hosted storage service 120. When the content provider 122 stores a data object in the hosted storage service 120, the content provider 122 can encrypt the data object encryption key with a provider key and store the encrypted data object encryption key with the encrypted data object. This provider key may be used by the content provider 122 to encrypt all data object encryption keys, or all data object encryption keys of a particular class (e.g. one key per copyright holder for a movie distributor). The content provider 122 can then provide the content key(s) to the access control service 124 or the access keystore 126 through a side-channel that does not include the client 102 or the hosted storage service 120. The hosted storage service 120 can store the encrypted data object encryption key in association with the data object, for example in the metadata 116.

Depending on the configuration of the system 100, the access control service 124 or the access keystore 126 can be sent the encrypted data object encryption key by the hosted storage service 120, the client 102, or the access control service 124. Additional authorization or authentication information may also be provided to show that the requesting party authorized to access the data object in decrypted form. In response to a valid request, the access control service 124 or the access keystore 126 can decrypt the data object encryption key and return it to the requestor. In addition to the features of a stateless access control service 124 or the access keystore 126, the scheme also permits the use of different data object encryption keys for every data object. As such, access one data object of the content provider 122 (e.g. one movie) need not permit or enable access to anther data object of the content provider 122 (e.g. a different movie).

Described here are schemes for validation of the hosted storage service 120 and the access control services 124. These schemes may be used to ensure that only hosted storage services 120 and access control services 124 specified by the content provider 122 and/or client 102 are used for storage and access control, respectively. They may prevent, for example, use of a rogue access control service that is configured to grant any authorization request, or denial of service attacks to the access control service 124.

In one scheme, the content provider 122 registers the hosted storage service 120 with the access control service 124. This registration may include, for example, a listing or classification of data objects that the content provider 122 will store in the hosted storage service 120. Then, any request to the access control service 124 will be compared with this validation information. If the hosted storage service 120, and any other information, of an access request matches the validation information, the access control service 124 can process the access authorization 518.

In another scheme, the content provider 122 can register the access control service 124 with the hosted storage service 120. This registration may include, for example, a listing or classification of data objects that the access control service 124 can authorize access to. If the access control service 124, and any other information, matches the access metadata of a data object being request, the hosted storage service 120 can send the access request 216.

In some cases of bi-directional validation in which both the hosted storage service 120 and the access control service 124 have been validated with each other, the validation process can include certificates that define the valid endpoints. For example, the hosted storage service 120 and/or the access control service 124 may require that communication be over SSL.

The registration of the hosted storage service 120 by the client 102 in the access control service 124 may include the creation of a secret. This secret can be used by the client 102 as authentication information when requesting a data object from the hosted storage service 120, and the hosted storage service 120 can pass this secret to the access control service 124 with the authorization request to show that the authorization request is on behalf of the client 102. To create this secret, the client 102 can authenticate itself to the access control service 124 using any appropriate client-server authentication mechanisms (e.g. user name and password, client certificate, one time password, hardware tokens). Once authenticated, the client 102 and the access control service 102 can create and agree on a symmetric encryption key that will be referred to as a session key. The client may then generate a tag, sometimes called a message authentication code or MAC secret, for a request sent to the hosted storage service 120 for a data object that is authorized by the access control service. This tag may be created via a cryptographic hashing function that takes the session key and the message as input and returns the tag as output. The hosted storage service 120 can include the tag in the authorization request to the access control service 124. The access control service, which has a copy of the session key, may verify that the request originated with the client 102. In some cases, the access control service 124 can use the session key, or a key derived from the session key, to encrypt the data object or data object encryption keys before they pass back through the hosted storage system 120 to the client 102.

In some implementations, the hosted storage service 120 may be independently authenticated by access control service 124, and/or the access control service 124 may be independently authenticated by the hosted storage service 120. That is, the hosted storage service 120 and the access control service 124 may have an authentication relationship that is independent of the client 102. This may permit, for example, the hosted storage service 120 and the access control service 124 to expose their authorization endpoints to the Internet without accepting traffic from valid hosted storage services and access control services.

The process 500 can be used to facilitate a number of uses. Described below are a number of example uses, although others are possible.

The process 500 can be used to assure compliance with a regulatory, contractual, or insurance mandate. For example, a business may be required to maintain records for inspection by compliance officers. The business may store the records in the hosted storage service 120 and assign a trusted access control service 124 to permit access by the compliance officer and reject attempts by the business to alter the records.

An administrator of the data objects may use the process 500 to facilitate fail-safe auditing of access requests. That is, the administrator may log, in the access control server 124, authorization requests to the data object. Using behavior heuristics, the administrator may determine, before granting access to the data object, that a new access request is malicious or from an untrusted party (e.g. from a computer system with a virus). The administrator may deny access or contact the user that apparently generated the access request, as appropriate.

The process 500 may be used when the hosted storage service 120 does not or cannot have access to all information needed to authorize access to a data object. For example, the access control service 124 may be a component of another computer system such as a corporate network. This corporate network may use information to authorize access that is secret or constantly changing. For example, the location of an employee, as determined by key-card swipes, can be used to ensure that an employee is in the corporation's building before authorizing access to sensitive documents.

Some authentication processes require interactions between the client 102 and the access control service 124 during authorization. For example, a request to access downloadable content by a video game client may require the user of the video game to process a real or in-game financial transaction or to complete and in-game challenge.

Collaborative software development projects can use the process 500 for code management. In this example, any user may be permitted to read a data object, as defined by a {role, scope} ACL 118 for the project's bucket, but any edits or uploads must be reviewed by a code maintenance team, as defined by a remote authorization ACL 118.

Figure 6:
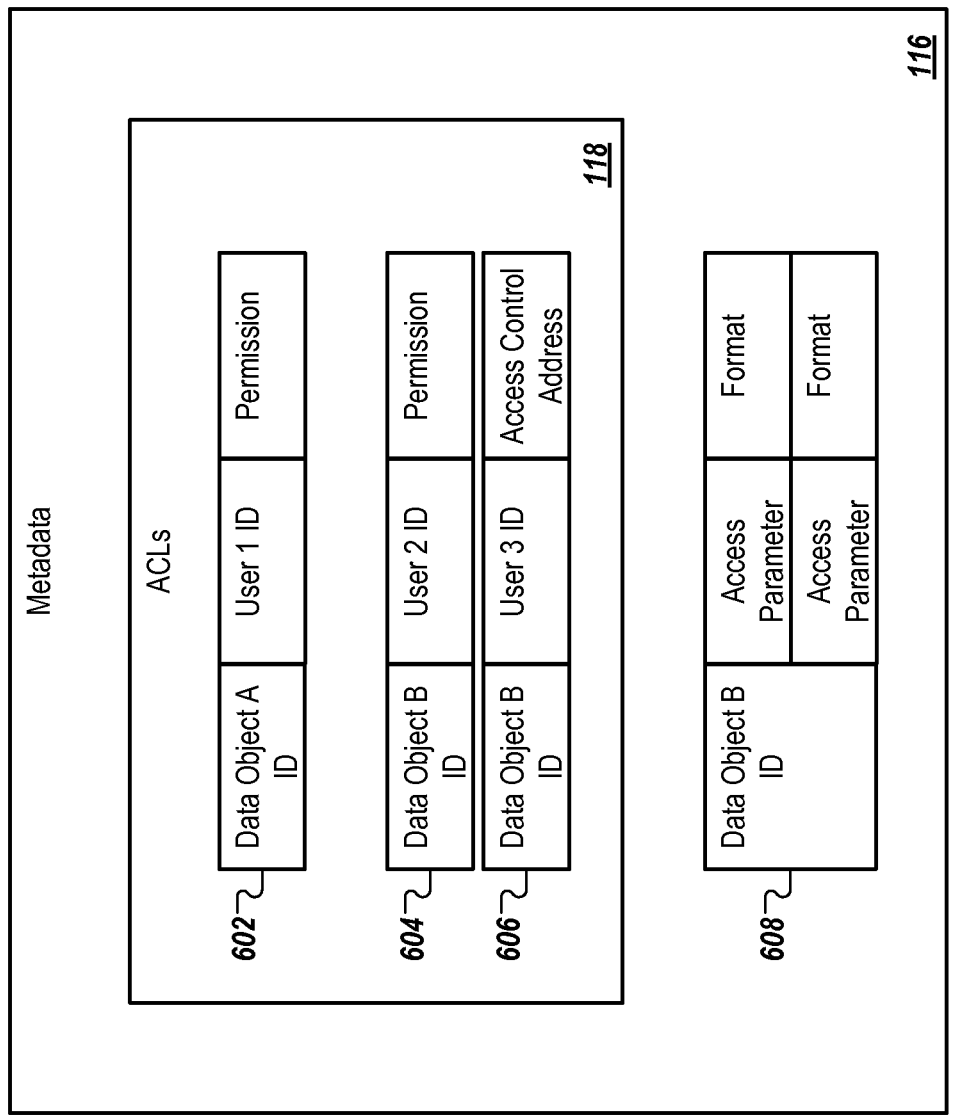
FIG. 6 is a block diagram showing an example of hosted storage metadata and access control lists.

FIG. 6 is a block diagram showing an example of hosted storage metadata 116 and access control lists 118. In this example, the hosted storage service 120 is storing at least two data objects, data object A and data object B, though more, fewer, and different data objects may be stored in other examples. Different configurations of the hosted storage service 120 may use some, all, or none of the metadata 118 and ACLs 116 shown.

Data object A is stored, in this example, in association with the ACL 602. The ACL 602 is formatted as a {scope, role} tuple that defines the authorization permission available to User 1 for data object A. Although only a single user is shown in ACL 602, other {scope, role} ACLs can define permissions for multiple users, user groups, etc. When a user attempts to access the data object A, the ACL 602 is used, for example by the interface backend 108, to determine if the access is permitted or not.

Data object B is stored, in this example, with some or all of the ACLs 604 and 606 and the metadata 608. Although only a single user is shown in each of the ACLs 604 and 606, other ACLs can define permissions for multiple users, user groups, etc. The ACL 604 is a {scope, role} formatted ACL which defines the authorization permission available to User 2. The ACL 606 is a remote access formatted ACL that lists an access control address. The access control address references a remote access control service, such as the remote access control service 124, which determines authorization access of data object B for User 3. The metadata 608 can specify access parameters and the format of those access parameters in access request messages from the hosted storage service 120 to the access control service. In some implementations, a single ACL 118 can have entries of both {scope, role} format and remote access format. That is, a single ACL 118 may contain the ACLs 604 and 606.

In some configurations of the hosted storage service 120, the interface backend 108 can check for {scope, role} formatted ACLs 118 first, and fall back on remote access formatted ACLs 118. Here, a user entry in the ACL 604 would effectively supersede a user entry in the ACL 606. For example, consider User 2 ID and User 3 ID as Service Group ID, to which any particular user may or may not be a member. If a user requests access to the data object B and is a member of the User 2 service group, the permission field of the ACL 604 is used to determine access authorization. If the user is not a member of the User 2 service group but is a member of the User 3 service group, the ACL 606 is used to determine access authorization.

In some other configurations, the interface backend 108 can check for remote access formatted ACLs 118 first, and fall back on {scope, role} formatted ACLs 118. In these configurations, a user entry in the ACL 606 would effectively supersede a user entry in the ACL 604. In this confirmation, if the user is a member of the User 3 service group, the ACL 606 would be used, even if the user is also a member of the User 2 service group.

The hosted storage service 120 can be configured to ensure that the owner of a data object, or the owner of the bucket containing the data object, is always given the FULL_CONTROL role. For example, this can ensure that, even if an access control service is misconfigured and erroneously rejecting all access request or is off-line, the owner of the data object is able to access the data object.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a microdrive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method performed by one or more processors, the method comprising:

receiving, at a hosted storage service, a resource and a request to store the resource, the request including a location of an access control service, wherein the access control service is separate from the hosted storage service and controls access permissions for the resource;

storing, at the hosted storage service, the resource in association with metadata that indicates the location of the access control service;

receiving, at the hosted storage service and from a client system, a request to access the stored resource;

accessing, at the hosted storage service, the metadata stored in association with the resource;

determining, at the hosted storage service and based on the metadata, that access permissions for the resource are controlled by the access control service;

in response to determining that access permissions for the resource are controlled by the access control service, sending an access request from the hosted storage service to the access control service, the access request identifying the resource and a user of the client system;

receiving, at the hosted storage service and from the access control service, an access response that indicates the user is permitted to access the resource; and in response to receiving the access response, sending the resource from the hosted storage service to the client system, wherein the resource is encrypted by a content provider with a first key before the resource is received at the hosted storage service;

receiving, at the hosted storage service, the first key encrypted with a client key; and sending, by the hosted storage service and to the client system, the first key encrypted with the client key for decryption by the client using the client key, wherein the first key encrypted with a client key is received from an access keystore that is subject to a different administrative control than the hosted storage service and subject to a different administrative control than the access control service.

2. The method of claim 1, wherein the access control service maintains an access control list that defines who is authorized to perform actions on resources, and the nature of the permitted actions.

3. The method of claim 1, wherein the access control service is subject to a different administrative control than the hosted storage service.

4. The method of claim 1, wherein the first key is provided to the client system from the content provider.

5. The method of claim 1, wherein the first key is encrypted with a provider key and wherein the method further comprises:

receiving, at the hosted storage service, the encrypted first key; and storing, at the hosted storage service and in association with the resource, the encrypted first key.

6. The method of claim 5, the method further comprising;

in response to receiving the access response, sending the encrypted first key from the hosted storage service to the client system.

7. The method of claim 1, wherein the metadata stored in association with the resource comprises an access control list.

8. The method of claim 7, wherein the access control list identifies a user and access permission for the associated resource for the user.

9. The method of claim 7, wherein the hosted storage service stores a second resource in association with a second access control list which identifies a second user and a second access permission for the associated second resource for the second user.

10. The method of claim 1, the method further comprising:
receiving, at the hosted storage service, a validation of the access control service indicating that the access control service is able to be used for authorizing access to the resource.

11. The method of claim 1, wherein receiving a request to access the stored resource includes receiving authentication information agreed upon by client system and the access control service; and
wherein sending an access request to the access control service include sending the authentication information.

12. A computer system comprising:
a hosted storage service comprising at least one processor and computer memory and configured to:
receive a resource and a request to store the resource, the request including a location of an access control service, wherein the access control service is separate from the hosted storage service and controls access permissions for the resource;
store the resource in association with metadata that indicates the location of the access control service;
receive a request to access the stored resource;
access the metadata stored in association with the resource;
determine, based on the metadata, that access permissions for the resource are controlled by the access control service;
in response to determining that access permissions for the resource are controlled by the access control service, send an access request to the access control service, the access request identifying the resource and a user of a client system; and
receive, from the access control service, an access response that indicates the user is permitted to access the resource; and
in response to receiving the access response, send the resource from the hosted storage service to the client system;
the client system comprising at least one processor and computer memory and configured to:
send, to the hosted storage service, the request to access the stored resource; and
receive from the hosted storage service, the resource;
an access control service configured to:
receive, from the hosted storage service, the access request; and
send, in response to receiving the access request, the access response; and
a content provider comprising at least one processor and computer memory and configured to:
encrypt the resource with a first key; and
send, after encrypting the resource, the resource to the hosted storage service;
wherein:
the access control service further configured to:
encrypt the first key with a client key; and
send, to the hosted storage service, the first key encrypted with the client key;
the hosted storage service further configured to:
receive the first key encrypted with the client key; and
send, to the client system, the first key encrypted with the client key;
the client system further configured to receive the first key encrypted with the client key; and
an access keystore comprising at least one processor and computer memory and that is subject to a different administrative control than the hosted storage service and subject to a different administrative control than the access control service, the access keystore configured to:
send, to the hosted storage service, the first key encrypted with a client key to the hosted storage system;
wherein:
the hosted storage service further configured to:
receive the first key encrypted with a client key.

13. The system of claim 12, wherein the access control service maintains an access control list that defines who is authorized to perform actions on resources, and the nature of the permitted actions.

14. The system of claim 12, wherein the access control service is subject to a different administrative control than the hosted storage service.

15. The system of claim 12, wherein:
the content provider is further configured to send, to the client system, the first key; and
the client system is further configured to receive the first key.

16. The system of claim 12, wherein the first key is encrypted with a provider key and wherein the hosted storage service is further configured to:
receive the encrypted first key; and
store the encrypted first key in association with the resource.

17. The system of claim 16, wherein the hosted storage service is further configured to send the encrypted first key to the client system in response to receiving the access response.

18. The system of claim 12, wherein the metadata stored in association with the resource comprises an access control list.

19. The system of claim 18, wherein the access control list identifies a user and access permission for the associated resource for the user.

20. The system of claim 18, wherein:
the hosted storage service is further configured to store a second resource in association with a second access control list which identifies a second user and a second access permission for the associated second resource for the second user.

21. The system of claim 12, wherein the hosted storage service is further configured to receive a validation of the access control service indicating that the access control service is able to be used for authorizing access to the resource.

22. The system of claim 12, wherein, to receive a request to access the stored resource, the hosted storage service is further configured to receive authentication information agreed upon by client system and the access control service; and
wherein to send an access request to the access control service, the hosted storage service is configured to send the authentication information.

* * * * *